United States Patent [19]

Honda et al.

[11] Patent Number: 5,223,945
[45] Date of Patent: Jun. 29, 1993

[54] RECORDING MODE DISCRIMINATION CIRCUIT

[75] Inventors: Takashi Honda, Kanagawa; Jun Hirai, Tokyo, both of Japan

[73] Assignee: Sony Corporation, Tokyo, Japan

[21] Appl. No.: 647,566

[22] Filed: Jan. 29, 1991

[30] Foreign Application Priority Data

Jan. 31, 1990 [JP] Japan .................................. 2-1118
Feb. 16, 1990 [JP] Japan .................................. 3-5728

[51] Int. Cl.$^5$ .............................................. H04N 5/76
[52] U.S. Cl. ................................. 358/335; 358/330; 360/27; 360/30
[58] Field of Search ................. 358/310, 335, 330; 360/27, 30, 33.1

[56] References Cited

U.S. PATENT DOCUMENTS 4,786,986 11/1988 Yamanushi et al.
4,963,991 10/1990 Honjo .................................. 358/335
5,113,265 5/1992 Kobayashi et al. ................. 358/330

FOREIGN PATENT DOCUMENTS 335655 10/1989 European Pat. Off.
335748 10/1989 European Pat. Off.

Primary Examiner—Tommy P. Chin
Assistant Examiner—Thai Tran
Attorney, Agent, or Firm—Lewis H. Eslinger; Jay H. Maioli

[57] ABSTRACT

A recording mode discriminating circuit corresponding to reproduced signals of first and second recording modes in which a carrier frequency of frequency-modulated luminance signal becomes high and low includes a first bandpass filter using an upper side band wave frequency of the first recording mode as a central frequency thereof, a second bandpass filter using a predetermined carrier frequency of the second recording mode as a central frequency thereof, a discharge control circuit for flowing or interrupting a current of a first predetermined value in response to the presence or absence of the first bandpass filter when the reproduced signals are supplied, a charge and discharge control circuit for flowing or interrupting a current of a second predetermined value smaller than the first predetermined value in response to the presence or absence of the output of the second bandpass filter, and a capacitor commonly connected to the discharging circuit and the charging and discharging circuit, wherein the recording modes of the reproduced signals are discriminated on the basis of a voltage across the capacitor. Also, there is a magnetic recording and reproducing apparatus, to which the above-mentioned recording mode discriminating circuit can be suitably applied.

13 Claims, 11 Drawing Sheets

RECORDING MODE DISCRIMINATION CIRCUIT

BACKGROUND OF THE INVENTION

1. Field of the Invention

The present invention relates generally to a video tape recorder having a recording mode discriminating circuit and more particularly, is directed to a recording mode discriminating circuit for use with a video tape recorder (VTR) having a plurality of recording modes.

2. Description of the Prior Art

Conventionally, a video tape recorder has a number of recording systems corresponding to a normal mode and a high image quality mode. In the high image quality mode, a so-called high band system is employed, in which a carrier frequency of an FM (frequency modulated) luminance signal is shifted to a frequency higher than that of the normal mode and a frequency deviation range is widened, in order to obtain a reproduced picture of high image quality.

Figure 1A:
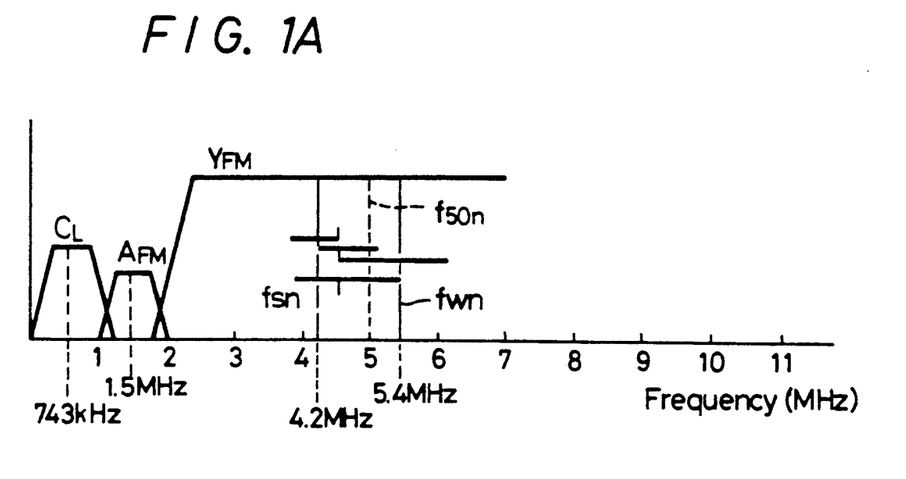
FIGS. 1A and 1B are diagrams, respectively of frequency allocations of a recording signal of a video tape recorder.
Figure 1B:
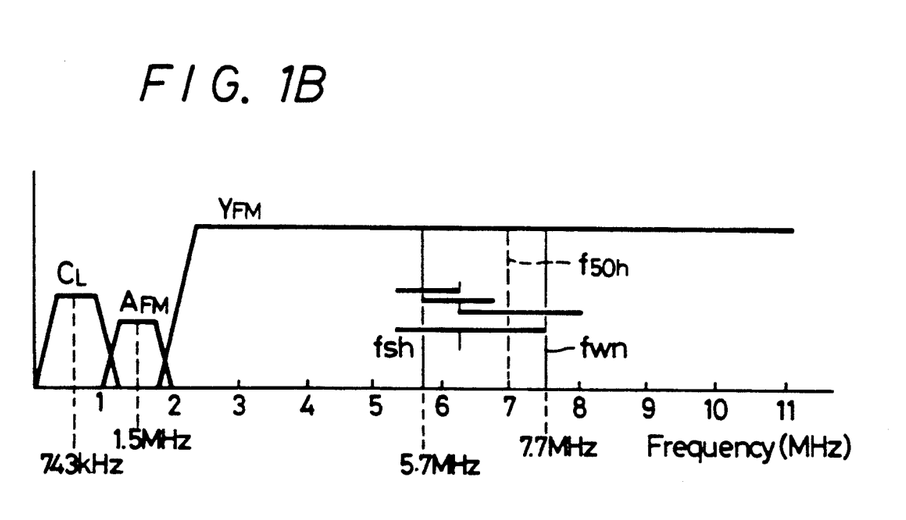

In the case of 8-mm type video tape recorder, FM luminance signals YFM of respective modes shown on the following table 1 are recorded together with a down converted chroma signal CL, an audio signal AFM, etc., on a magnetic tape in the frequency allocations shown in FIGS. 1A and 1B.

TABLE 1

|  | High image quality mode | normal mode |
| --- | --- | --- |
| luminance signal recording system | FM modulation recording | FM modulation recording |
| white peak frequency | 7.7 MHz | 5.4 MHz |
| sync. chip frequency | 5.7 MHz | 4.2 MHz |
| frequency deviation | 2.0 MHz | 1.2 MHz |
| pre-emphasis time constant | 0.47 μs | 1.3 μs |
| clipping level |  |  |
| white clip | 220% | 220% |
| dark clip | 90% | 90% |

In the reproducing system 1, a recording mode discriminating circuit is utilized in order to automatically discriminate a plurality of the above-mentioned recording modes and to reproduce a picture.

Figure 2:
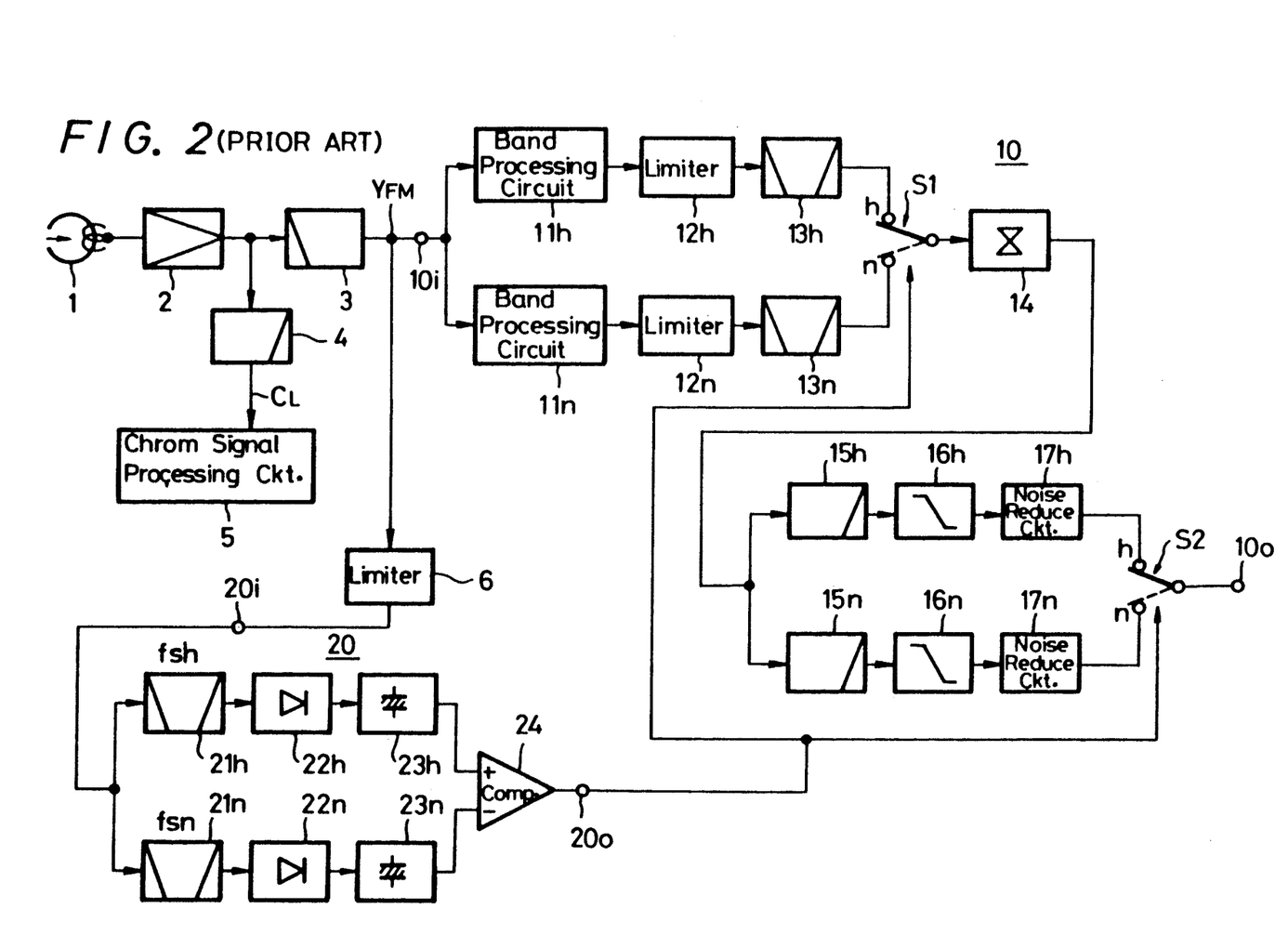
FIG. 2 is a schematic block diagram showing a first example of a conventional video tape recorder.

A conventional video tape recorder capable of coping with a plurality of recording modes is arranged as, for example, shown in FIG. 2.

Referring to FIG. 2, there is provided a luminance signal reproducing system 10. A reproduced RF (radio frequency) signal from a magnetic head 1 is commonly supplied through a playback amplifier 2 to a high-pass filter 3 and a low-pass filter 4 which are used to perform a so-called Y/C separation. A down converted chroma signal CL from the low-pass filter 4 is supplied to a color signal processing system 5 and an FM luminance signal YFM from the high-pass filter 3 is supplied to an input terminal 10i of the luminance signal reproducing system 10.

The FM luminance signal YFM is commonly supplied to RF band processing circuits 11h and 11n of the high image quality mode and of the normal mode, respectively. Limiters 12h and 12n for preventing inversion and band-pass filters 13h and 13n are connected in cascade to the band processing circuits 11h and 11n, respectively whereby, together with the magnetic head 1, a proper band-processing such as a peaking-process or the like is performed so as to balance double sideband waves of the FM signal. The limiters 12h and 12n are each constructed as a soft limiter or a double-limiter type, and the outputs of the band-pass filters 13h and 13n are supplied through a change-over switch S1 to an FM demodulator 14.

An output of the FM demodulator 14 is supplied through low-pass filters 15h and 15n of high image quality mode and normal mode to de-emphasizing circuits 16h and 16n. The frequency characteristics of the low-pass filters 15h and 15n are set, for example, to 5 MHz flat and 3 MHz flat in response to the frequency allocations shown in FIGS. 1A and 1B to thereby provide horizontal resolutions of about 430 horizontal scanning lines and about 270 horizontal scanning lines, respectively. Reproduced luminance signals Y from the de-emphasizing circuits 16h and 16n are supplied through noise reducing circuits 17h and 17n including comb-filters and a change-over switch S2 to an output terminal 10o.

Referring to FIG. 2, there is provided a recording mode discriminating circuit 20, in which the FM luminance signal YFM from the high-pass filter 3 is supplied through a limiter 6 to an input terminal 20i thereof. Band-pass filters 21h and 21n for high image quality mode and normal mode are commonly connected to the input terminal 20i. Central frequencies of the two band-pass filters 21h and 21n are set to sync. chip frequencies fsh and fsn of the high image quality mode and the normal mode as shown on the earlier noted table 1 where fsh is 5.7 MHz and fsn is 4.2 MHz, respectively.

Detecting circuits 22h, 22n and hold circuits 23h, 23n are connected in cascade to the two band-pass filters 21h and 21n, respectively. Outputs of the hold circuits 23h and 23n are supplied to a comparator 24 and an output of this comparator 24 is supplied through a terminal 20o to the change-over switches S1 and S2.

When the FM luminance signal YFM supplied to the recording mode discriminating circuit 20 is the signal of the high image quality mode, the output of the hold circuit 23h generally becomes larger than that of the hold circuit 23n, thus making the output of the comparator 24 "high" level.

Conversely, when the FM luminance signal YFM is the signal of the normal mode, the output of the hold circuit 23n generally becomes larger than that of the hold circuit 23h, thus making the output of the comparator 24 "low" level.

By the above-mentioned discriminated outputs, the switches S1 and S2 are connected to the predetermined positions in response to the recording modes.

Incidentally, the frequency and level of the luminance signal are considerably changed in association with the pattern of the original picture, and the frequency spectrum of the FM luminance signal YFM is also changed in association therewith.

Figure 3:
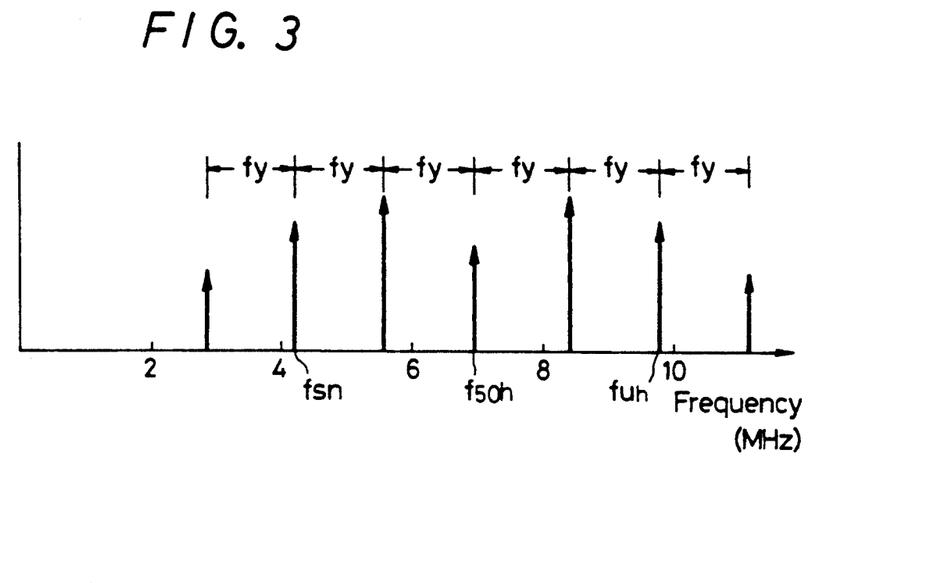
FIG. 3 is a diagram of a frequency spectrum of an FM luminance signal, and to which references will be made in explaining operation of the conventional video tape recorder shown in FIG. 2.

As a consequence, as, for example, shown in FIGS. 1A and 1B, even in the signal of the high image quality mode in which a carrier frequency corresponding to white level of 50% satisfies f50h=7.0 MHz as shown in FIG. 1B, if a frequency fy of an original luminance signal satisfies the following equation (1), a frequency of an m-order lower side band wave falls in the vicinity of the sync. chip frequency fsn of the normal mode as shown in FIG. 3. In FIG. 3, m=2 is established.

$$m \cdot fy \approx f50h - fsn \tag{1}$$

In that event, in the mode discriminating circuit 20 shown in FIG. 2, there is then the risk that the reproduced signal of the high image quality mode shown in FIG. 3 is erroneously identified as the reproduced signal of the normal mode.

Figure 4:
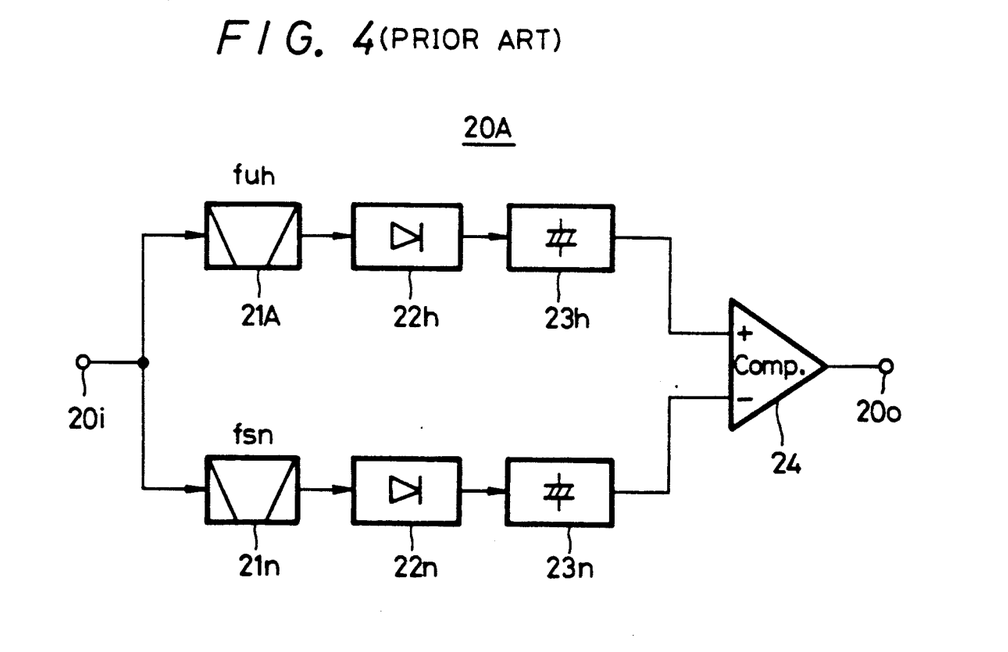
FIG. 4 is a schematic block diagram showing a main portion of a second example of a conventional video tape recorder.

To solve this problem of erroneous discrimination, the assignee of the present application has previously proposed a mode discriminating circuit in which, when a signal component exists near the sync. chip frequency fsn of the normal mode, it is determined on the basis of the existence or absence of the m-order upper side band wave whether the reproduced signal is the reproduced signal of the high image quality mode or not, thereby preventing an erroneous discrimination (see Japanese Patent Application No. 63-75517 or Japanese Laid-Open Patent Gazette No. 1-246975). FIG. 4 shows such previously-proposed mode discriminating circuit 20A. In FIG. 4, like parts corresponding to those of FIG. 2 are marked with the same references and therefore need not be described in detail.

As shown in FIG. 4, in this mode discriminating circuit 20A, a central frequency fuh of the bandpass filter 21A of the high image quality mode is set as expressed by the following equation.

$$fuh = f50h + m \cdot fy \approx 2 \cdot f50h - fsn \quad (2)$$

Accordingly, with respect to the carrier frequency f50h of the high image quality mode signal corresponding to the white level of 50%, this frequency fuh becomes symmetrical to the sync. chip frequency fsn of the normal mode and is determined in the example of the aforenoted numeric values as follows.

$$fuh = 9.8 \text{ MHz}$$

Further, the pass band width of the bandpass filter 21A corresponds to the change of the pattern of the original picture and is therefore determined to be relatively wide. The rest of FIG. 4 is similar to the mode discriminating circuit 20 of FIG. 2.

As shown in FIG. 3, in the FM luminance signal of the high image quality mode, when the m-order lower side band wave exists in the vicinity of the sync. chip frequency fsn of the normal mode, an m-order upper side band wave exists symmetrically about the carrier wave.

Accordingly, in the mode discriminating circuit 20A of FIG. 4, the recording mode is discriminated as in the following table 2.

TABLE 2

| fsn component | exists | exists | none | none |
|---|---|---|---|---|
| fuh component | exists | none | exists | none |
| discrimination mode | High image quality mode | normal mode | High image quality mode | High image quality mode |

In the mode discriminating circuit 20A of FIG. 4, however, an electrolytic capacitor of relatively large capacitance, for example, about 10 μF is utilized in each of the hold circuits 23h and 23n in order to reduce noise. There is then the disadvantage that the mode discriminating circuit 20A of FIG. 4 cannot be fabricated as an IC (integrated circuit) without difficulty.

Further, load resistances of the respective detecting circuits 22h and 22n are set as relatively large values, for example, about 10 kΩ in order to suppress the consumption of current so that a discharge time constant becomes large, which urges the discrimination of recording mode to be performed at low speed.

Incidentally, in the case of an 8-mm video tape recorder, fundamentally, a coating type metal (MP) tape is utilized in the normal mode while an evaporation type metal (ME) tape is utilized in the high image quality mode. Further, it is frequently observed that a high efficiency coating metal (MPHG) tape is utilized in the high image quality mode.

Figure 5A:
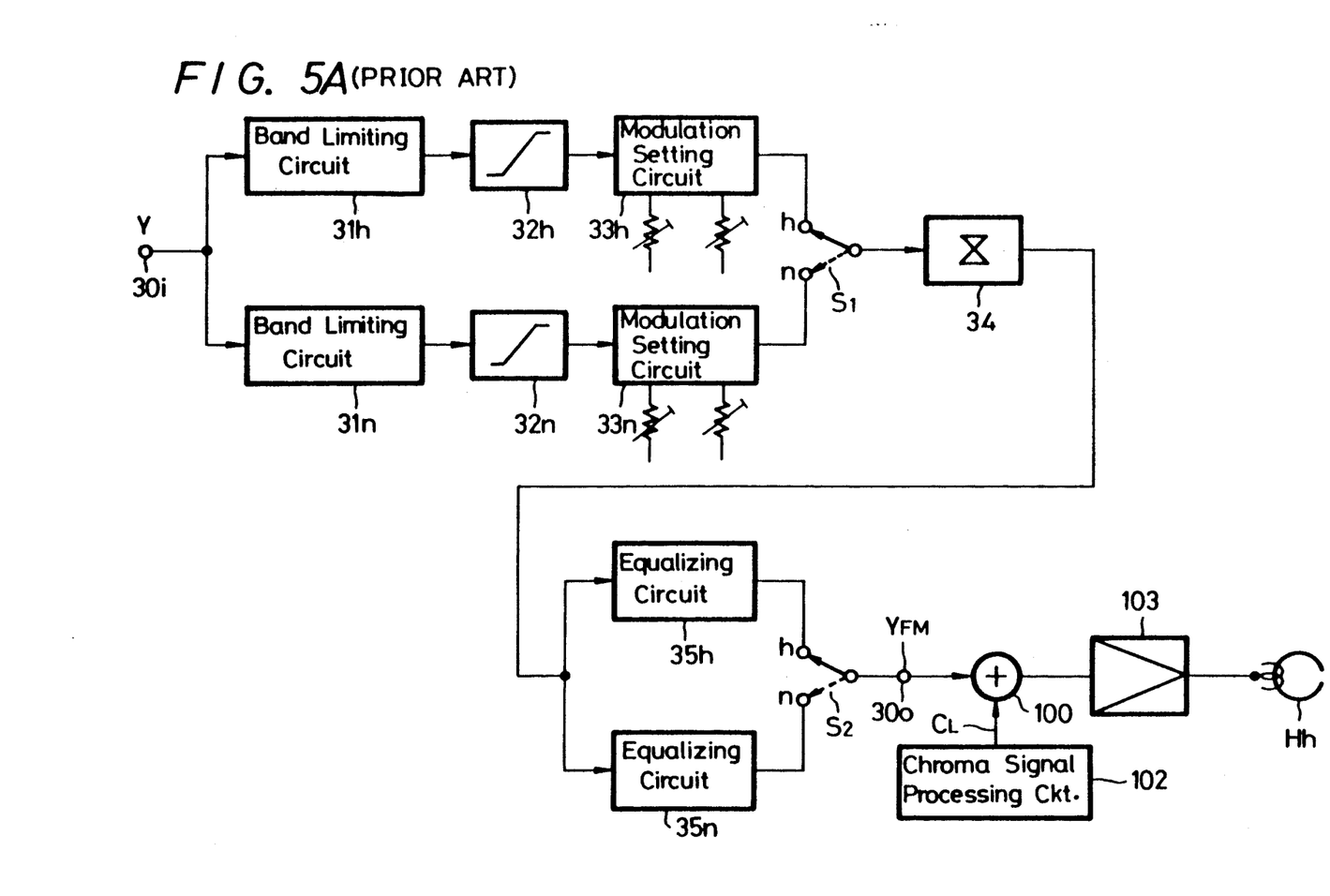
FIGS. 5A and 5B are schematic diagrams, respectively of a third example of a conventional video tape recorder.
Figure 5B:
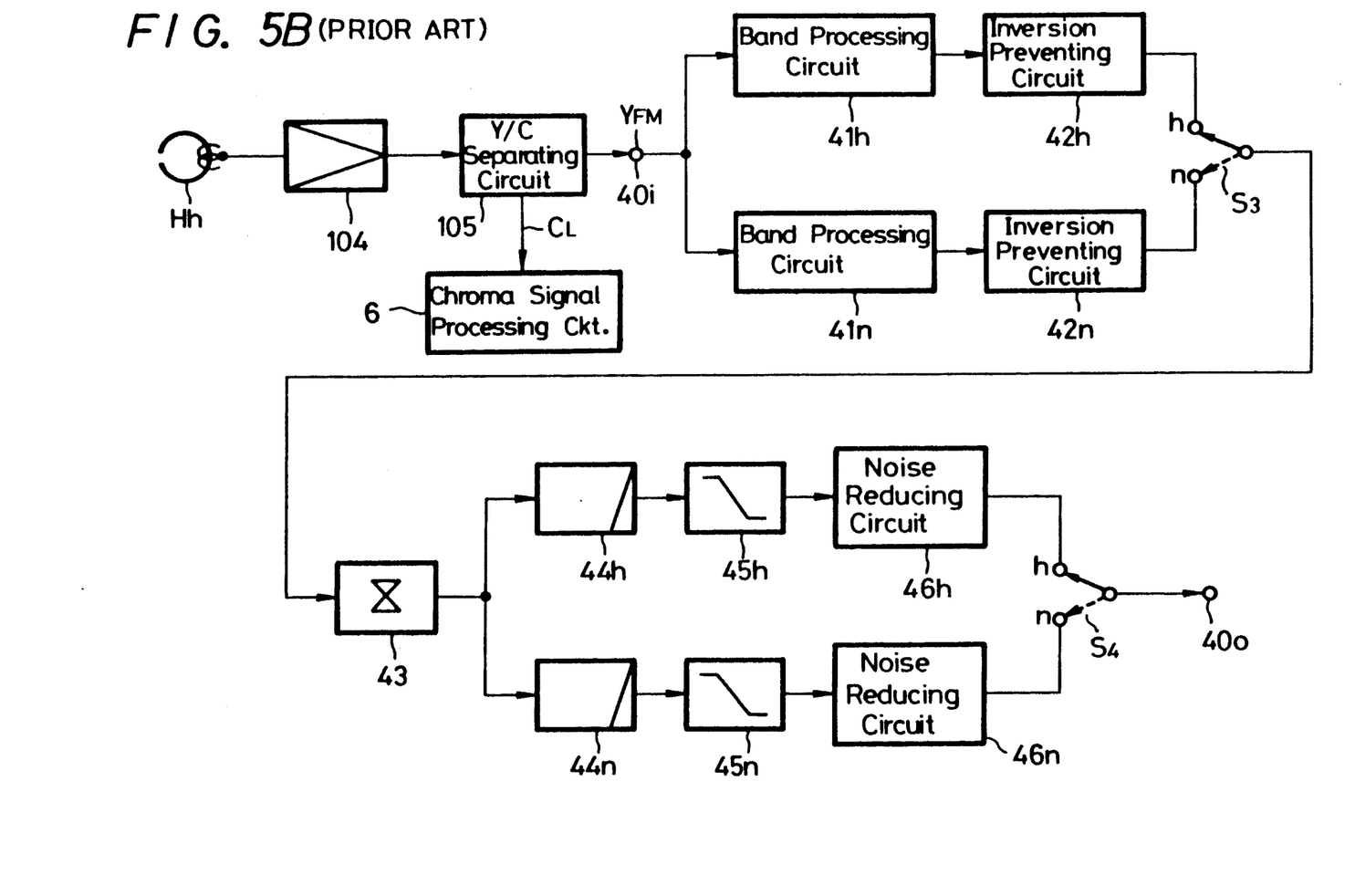

The conventional 8-mm video tape recorder capable of coping with a plurality of modes such as the normal mode and the high image quality mode is arranged as, for example, shown in FIGS. 5A and 5B.

Referring to FIG. 5A, there is shown a luminance signal recording system in which reference numeral a luminance signal Y applied to an input terminal 30i is commonly supplied to a high image quality mode band limiting circuit 31h and a normal mode band limiting circuit 31n, thereby preventing an aliasing noise in the spectrum of an FM signal. Outputs of the band limiting circuits 31h and 31n are supplied through pre-emphasizing circuits 32h and 32n to modulation setting circuits 33h and 33n, in which DC levels and AC amplitudes thereof are set to predetermined values of the two modes. Outputs of the modulation setting circuits 33h and 33n are supplied through the change-over switch S1 to an FM modulator 34, whereby the FM signal YFM on the preceding table 1 is output from the FM modulator 34. This output signal YFM is supplied through equalizing circuits 35h and 35n and the change-over switch S2 to an output terminal 30o. In an adder 100, the FM luminance signal YFM and the down converted chroma signal CL from a recording-side color signal processing circuit 102 are added and then fed through a recording amplifier 103 to a magnetic head Hh for high image quality mode.

Referring to FIG. 5B, there is provided a luminance signal reproducing system, in which a reproduced RF signal from a magnetic head Hh is through a playback amplifier 104 to a Y/C separating circuit 105. The thus separated chroma signal CL is supplied to a reproducing-side color signal processing circuit 106, and the FM luminance signal YFM is supplied through an input terminal 40i to high image quality and normal mode RF band processing circuits 41h, respectively and 41n.

Figure 6A:
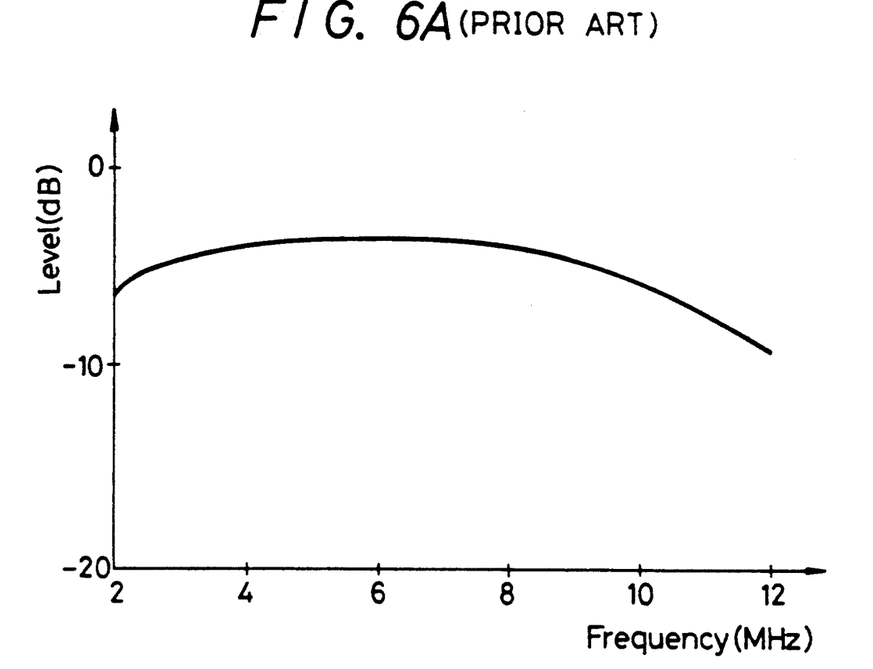
FIGS. 6A and 6B are, respectively, characteristic graphs of frequency versus level, and to which references will be made in explaining operation of the third example of the conventional video tape recoder.
Figure 6B:
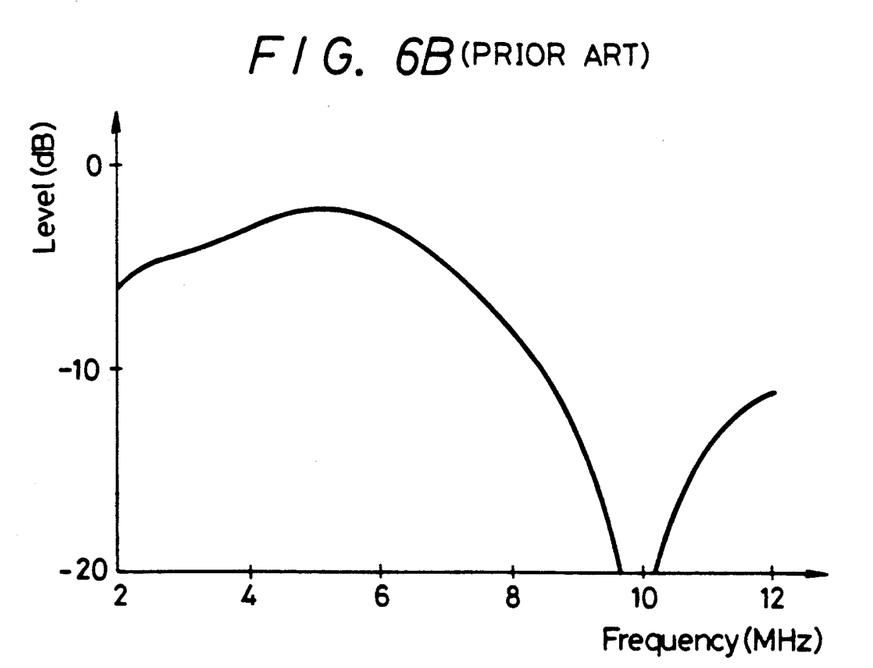

In the band processing circuits 41h and 41n, the band processing such as the peaking of frequency characteristics shown in FIGS. 6A and 6B or the like is performed so as to balance double side band waves of the FM signal in the form of being applied to the magnetic head Hh and succeeding inversion preventing circuits 42h and 42n. The inversion preventing circuits 42h and 42n each include soft limiters and bandpass filters though not shown, and outputs of the inversion preventing circuits 42h and 42n are supplied through a change-over switch S3 to an FM demodulator 43.

An output of the FM demodulator 43 is supplied through low-pass filters 44h and 44n of high image quality mode and normal mode to de-emphasizing circuits 45h and 45n. The frequency characteristics of the low-pass filters 44h and 44n are set to, for example, 5 MHz flat and 3 MHz flat to thereby provide, for example, horizontal resolutions of 400 and 250 horizontal scanning lines and a predetermined S/N (signal-to-noise ratio) ratio. Reproduced luminance signals Y from the de-emphasizing circuits 45h and 45n are supplied through noise reducing circuits 46h and 46n including comb filters and a change-over switch S4 to an output terminal 40o.

In the video tape recorder capable of coping with only the normal mode recording system, however, not only the recording in the high image quality mode recording system is unsatisfactory but also the reproduction of the high image quality mode cannot be performed because a satisfactory reproduced signal cannot be obtained due to the frequency characteristic shown in FIG. 6B.

Further, in the conventional video tape recorder capable of coping with both the normal mode and the high image quality mode, most of the luminance signal system circuits of the recording and reproducing sides are provided exclusively for their own modes and generally formed of two systems. Therefore, the circuit arrangement is large as compared with the video tape recorder capable of coping with only the normal mode and the manufacturing cost thereof is unavoidably increased.

OBJECTS AND SUMMARY OF THE INVENTION

Accordingly, it is an object of the present invention to provide an improved recording mode discriminating circuit which can eliminate the aforenoted shortcomings and disadvantages encountered with the prior art.

More specifically, it is an object of the present invention to provide a recording mode discriminating circuit which can be fabricated as an integrated circuit with ease.

It is another object of the present invention to provide a recording mode discriminating circuit which can discriminate the recording mode accurately and readily.

It is a further object of the present invention to provide a magnetic recording and reproducing apparatus in which a circuit scale thereof is relatively small.

It is yet a further object of the present invention to provide a magnetic recording and reproducing apparatus in which a manufacturing cost can be prevented from being increased.

It is yet a further object of the present invention to provide a magnetic recording and reproducing apparatus which can perform a playback applicable to recording systems of a plurality of modes.

As a first aspect of the present invention, a recording mode discriminating circuit corresponding to reproduced signals of first and second recording modes in which the carrier frequency of the frequency-modulated luminance signal becomes high and low is comprised of a first bandpass filter using an upper side band wave frequency of the first recording mode as a central frequency thereof, a second bandpass filter using a predetermined carrier frequency of the second recording mode as a central frequency thereof, a discharge control circuit for flowing or interrupting a current of a first predetermined value in response to the presence or absence of the first bandpass filter when the reproduced signals are supplied, a charge and discharge control circuit for flowing or interrupting a current of a second predetermined value smaller than the first predetermined value in response to the presence or absence of the output of the second bandpass filter, and a capacitor commonly connected to the discharging circuit and the charging and discharging circuit, wherein the recording modes of the reproduced signals are discriminated on the basis of a voltage across the capacitor.

As a second aspect of the present invention, a magnetic recording and reproducing apparatus corresponding to a plurality of recording systems in which a frequency deviation of a frequency modulated luminance signal is wide and narrow is comprised of a recording system made corresponding to any one of the plurality of recording systems, and a reproducing system, the reproducing system having a plurality of band processing circuits corresponding to the plurality of recording systems and processing signals before being demodulated and a plurality of de-emphasizing circuits.

In accordance with a third aspect of the present invention, a magnetic recording and reproducing apparatus corresponding to a plurality of recording systems in which a frequency deviation of a frequency modulated luminance signal is wide and narrow is comprised of a recording circuit system and a magnetic head made corresponding to any one of the plurality of recording systems, and a reproducing circuit system having an inversion preventing circuit made common to the plurality of recording systems, a plurality of band processing circuits corresponding to the plurality of recording systems and processing signals before being demodulated and a plurality of de-emphasizing circuits.

The above, and other objects, features and advantages of the present invention will become apparent from the detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

A first embodiment of a recording mode discriminating circuit according to the present invention will hereinafter be described with reference to FIGS. 7 and 8.

Figure 7:
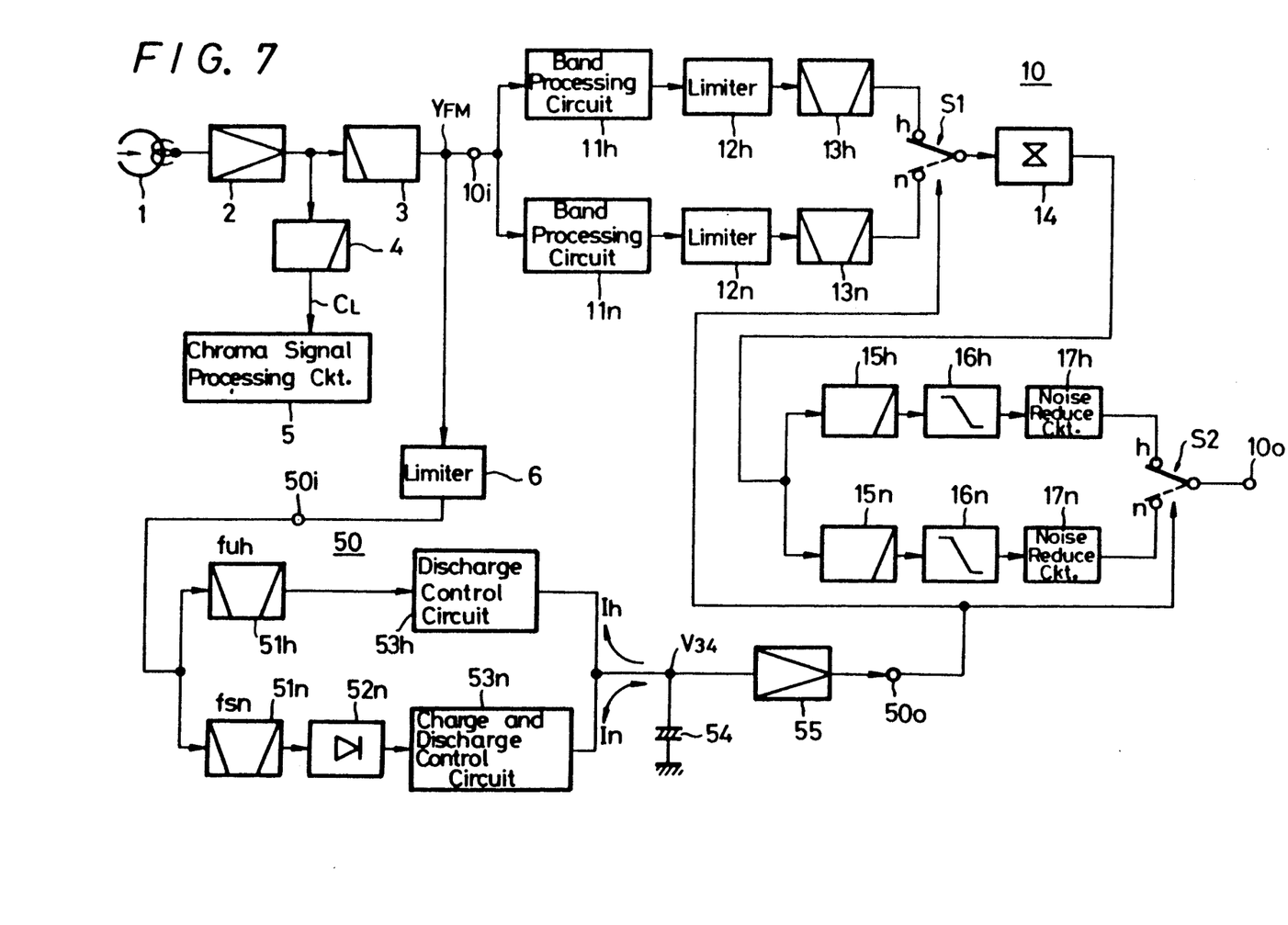
FIG. 7 is a schematic block diagram showing a first embodiment of a recording mode discriminating circuit according to the present invention.

FIG. 7 shows in block form an entirety of the first embodiment of the recording mode discriminating circuit according to the present invention and in FIG. 7, like parts corresponding to those of FIG. 2 are marked with the same references and therefore need not be described in detail.

Referring to FIG. 7, there is provided a recording mode discriminating circuit 50, wherein the FM luminance signal YFM from the high-pass filter 3 is supplied through the limiter 6 to an input terminal 50$i$ thereof. Bandpass filters 51$h$ and 51$n$ of high image quality mode and normal mode are commonly connected to the input terminal 50$i$. Central frequencies of the two bandpass filters 51$h$ and 51$n$ are respectively set to upper side band wave frequency fuh of high image quality mode and sync. chip frequency fsn of normal mode similarly to the example of the prior art shown in FIG. 4 proposed by the assignee of the present application.

fuh=9.8 MHz fsn=4.2 MHz

A detecting circuit 52$n$ and a charge and discharge control circuit 53$n$ are connected in cascade to the bandpass filter 51$n$ of the normal mode, and a discharge control circuit 53$h$ is connected in series to the bandpass filter 51$h$ of the high image quality mode.

A capacitor 54 is commonly connected to the discharge control circuit 53$h$ and the charge and discharge control circuit 53$n$, and a terminal voltage across the capacitor 54 is supplied through a buffer amplifier 55 and an output terminal 50$o$ to the change-over switches S1 and S2 as a control signal.

In this embodiment, a ceramic capacitor of relatively small capacity of about 0.1 μF is used as the capacitor 54, by way of example. The other circuit arrangement is substantially the same as that of FIG. 2.

Specific arrangements of the detecting circuit 52$n$, the discharge control circuit 53$h$ and the charge and discharge control circuit 53$n$ will be explained with reference to FIG. 8.

Figure 8:
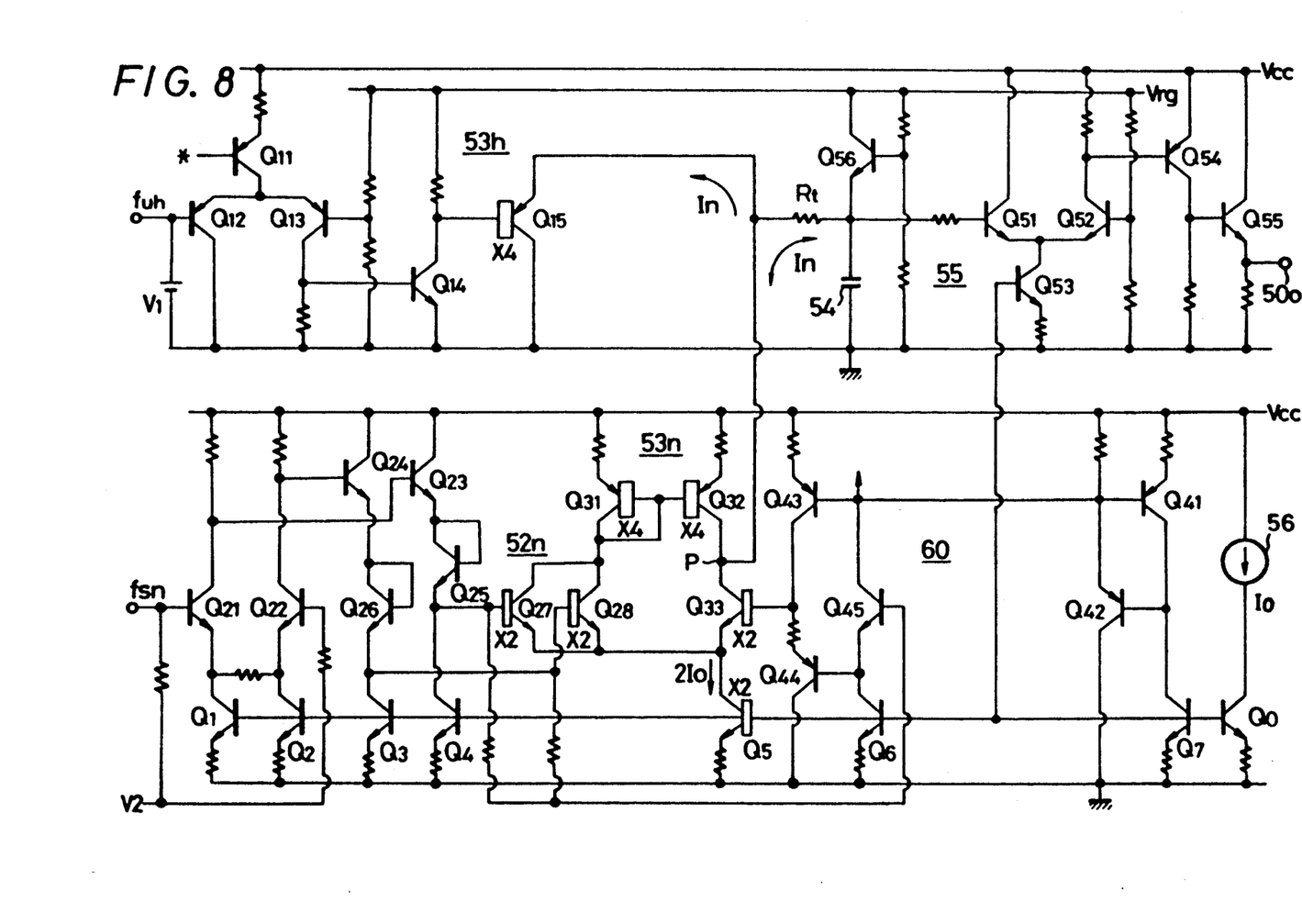
FIG. 8 is a schematic diagram showing a specific arrangement of a main portion of the first embodiment.

Referring to FIG. 8, the upper side band wave component of high image quality mode having a frequency fuh of, for example, 9.8 MHz is applied to the discharge control circuit 53$h$, in which pnp transistor Q11 is employed as an emitter current source and pnp transistors Q12 and Q13 are connected in a differential fashion thereto. A bias voltage VI of, for example, 2.5 V is applied to the base of the transistor Q12, while a bias voltage slightly higher than the above bias voltage V1 is applied to the base of the transistor Q13. A collector output of the transistor Q13 is supplied through a base-collector path of an npn transistor Q14 to the base of a pnp transistor Q15 whose base is as large as four times the base of the normal pnp transistor. The collector of the transistor Q15 is grounded directly.

In the detecting circuit 52$n$ and the charge and discharge control circuit 53$n$ to which there is supplied the signal component of the normal mode having the sync. chip frequency fsn of, for example, 4.2 MHz, a resistor is connected between emitters of npn transistors Q21 and Q22, and a proper bias voltage V1 is applied to the bases of the transistors Q21 and Q22, thereby constructing a phase inverting circuit. The collector outputs of the two transistors Q21 and Q22 are shifted in level, respectively, by transistors Q23 to Q26 and fed to, respectively, the bases of transistors Q27 and Q28 provded as detectors and whose bases are as large as twice the base of the normal transistor.

The collectors of the two transistors Q27 and Q28 are commonly connected to the bases of pnp transistors Q31 and Q32 connected in current-mirror fashion and whose bases are as large as four times the base of the normal transistor. The collector of the transistor Q32 and the collector of an npn transistor Q33 whose base is as large as twice the base of the normal transistor are connected together, and a junction P therebetween is connected to the emitter of the pnp transistor Q15 whose base is as large as four times the base of the normal transistor in the above-mentioned discharge control circuit 53$h$, and is also connected to the capacitor 54 via a resistor Rt. In this embodiment, a resistance value of the resistor Rt is set to a relatively low value, for example, about several 100s of ohms.

The emitter of the transistor Q33 is connected to the collector of the transistor Q5 whose base is as large as twice the base of the normal transistor provided as the current source together with the emitters of the transistors Q27 and Q28. The base of the transistor Q5 is connected to the base of transistor Q0 connected in series to a constant current source 56, and in this embodiment, a current value I0 of this constant current source 56 is set as follows.

I0=100 μA

The transistor Q33 is supplied at its base with the proper bias voltage V1 by transistors Q41 to Q45 of a bias setting circuit 60.

A terminal voltage V54 of the capacitor 54 is properly converted in level by transistors Q51 to Q55 of the buffer amplifier 55 and then fed to the terminal 50$o$.

In order to determine the lower limit of the voltage V54 across the capacitor 54, a collector-emitter circuit of a transistor Q56 is interposed between a proper voltage Vrg and the capacitor 54.

Operation of the first embodiment shown in FIG. 7 will be explained below.

When no signal is applied, according to the aforenoted setting of the bias voltage, the transistors Q13 to Q15 in the discharge control circuit 53$h$ are placed in their OFF state (see FIG. 8).

No base current flows to the transistors Q27 and Q28 provided as the detector 52$n$ and accordingly, no collector current flows, whereby no collector current flows to the transistors Q31 and Q32 connected in a current-mirror fashion. On the other hand, since no base current flows to the transistors Q27 and Q28, the base potential of the transistor Q33 is increased to set the transistor Q33 in its ON state. As a consequence, the collector current of the transistor Q33 flows unavoidably thereto through the resistor R5 and the junction P from the capacitor 54, thereby discharging the capacitor 54.

When the FM luminance signal YFM supplied to the recording mode discriminating circuit 50 is the signal of the normal mode, the signal component of sync. chip frequency fsn shown in FIG. 1A is supplied through the bandpass filter 51$n$ to the detecting circuit 52$n$ whose detected output is fed to the charge and discharge circuit 53n. In that case, the capacitor 54 is charged by a current In from the charge and discharge control circuit 53n and the terminal voltage 54V across the capacitor 54 is increased to the predetermned level Vn. This voltage Vn is properly converted in level by the buffer amplifier 55 and fed to the switches S1, S2, thereby connecting the two switches S1, S2 to contacts n, respectively.

More specifically, by the transistors Q27 and Q28 shown in FIG. 8, the signal component of frequency fsn is detected (full-wave rectified) and the collector current flows to the two transistors Q27 and Q28 over the whole period of the signal. On the other hand, by this full-wave rectification, the base potential of the transistor Q33 is decreased so that the transistor Q33 is set in its OFF state. As a result, the collector current of the transistors Q27 and Q28 transferred via the transistors, Q31 and Q32 connected in a current-mirror fashion flows from the junction P and fed through the resistor Rt to thereby charge the capacitor 54.

The charging current In is restricted by the current source transistor Q5 and is provided, in this embodiment, as follows.

$$In = 2 \cdot I0 = 200\ \mu A$$

On the other hand, when the FM luminance signal YFM is the signal of the high image quality mode and the m-order lower side band wave component exists in the vicinity of the sync, chip frequency fsn of the normal mode as shown in FIG. 3, the capacitor 54 is intended to be charged by the charging current In from the charge and discharge control circuit 53n on the basis of the detected output of the lower side band wave component similarly as described above.

In that case, however, the upper side band wave component existing at the same time symmetrically with respect to the carrier is supplied through the bandpass filter 51n to the discharge control circuit 53h. On the basis of the upper side band wave, the discharge control circuit 53h is turned on so that the current Ih flows to the discharge control circuit 53h from the capacitor 54.

To be more concrete, the signal component of frequency fuh is supplied by the amount of, for example, 0.5 V p−p and the transistor Q12 shown in FIG. 8 is turned OFF at every positive semi-cyclic period. Also, the transistor Q13 is turned ON and the transistors Q14 and Q15 are also turned ON, accordingly.

Consequently, at every semi-cyclic period of the signal component of frequency fuh, the junction P between the collectors of the transistors Q32 and Q33 in the charge and discharge control circuit 53h is grounded via the ON-resistance of the transistor Q15.

As earlier noted, the base of the transistor Q15 is as large as four times the normal base of the transistor and has a current drive capability of, for example, 4 mA.

Further, the current In from the charge and discharge control circuit 53n is restricted by the transistor Q15.

Therefore, a relationship expressed by the following equation (3) is established between the currents Ih and In of the two control circuits 53h and 53n with the result that the capacitor 54 is discharged, thus causing its terminal voltage V54 to be lowered to the predetermined value Vh.

$$Ih > In \quad (3)$$

As described above, according to this embodiment, the respective recording modes are discriminated as shown on the table 3 below.

TABLE 3

| fsn component | exists | exists | none | none |
|---|---|---|---|---|
| fuh component | exists | none | exists | none |
| charge and discharge control circuit 33h | charge | charge | discharge | discharge |
| discharge control circuit 33h | discharge | — | discharge | — |
| voltage of capacitor 34 | low | high | low | low |
| descrimination mode | High image quality mode | normal mode | High image quality mode | High image quality mode |

As set forth above in detail, according to this embodiment, since the single capacitor of small capacity is utilized and the time constant of its charge and discharge circuit is selected to be small, the recording mode discriminating circuit can be fabricated as an IC with ease, and the recording modes can be discriminated accurately and readily.

While the present invention is applied to the 8-mm video tape recorder as described above, the present invention is not limited thereto and may be applied to VHS, SVHS, Beta and other systems such as an ED (extended definition) Beta system in which the high band recording system is employed.

As described above in detail, according to the above embodiment of the present invention, since the recording mode discriminating circuit of the present invention is comprised of the large current discharge control circuit and the small current charge and discharge current responsive to the presence or absence of the respective signals components of the predetermined upper side band frequency of the high image quality mode and the predetermined carrier frequency of the normal mode and the capacitor commonly connected to the two control circuits and the recording mode of the reproduced signal is discriminated on the basis of the terminal voltage across this capacitor, the use of the capacitor is suppressed to the minimum and the recording mode discriminating circuit can be fabricated as an IC with ease. Furthermore, the high image quality recording mode and the normal recording mode in which the carrier frequency of the FM luminance signal is high and low can be discriminated accurately and readily.

Figure 9A:
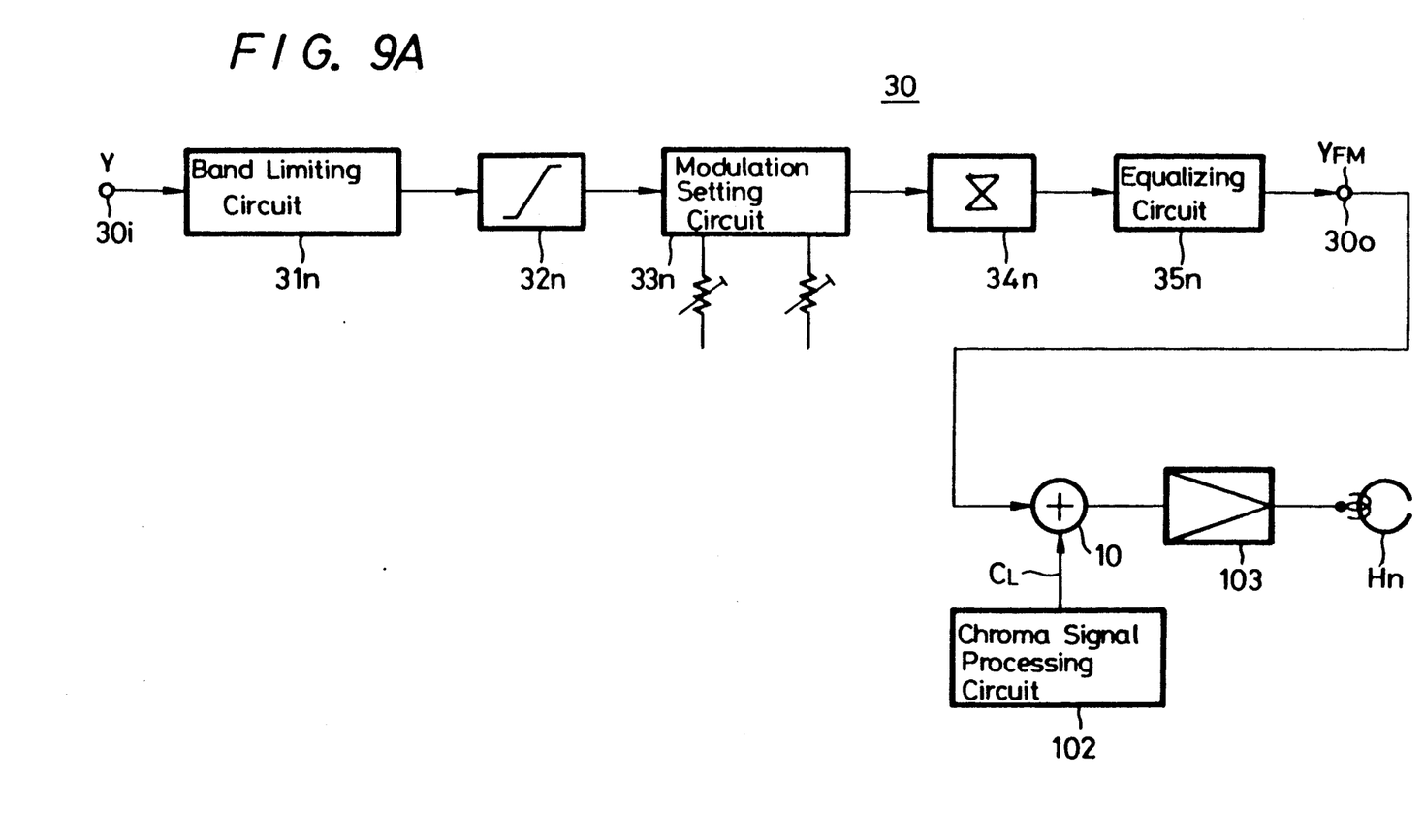
FIGS. 9A and 9B are schematic block diagrams showing a second embodiment of the present invention which is applied to a magnetic recording and reproducing apparatus, respectively.
Figure 9B:
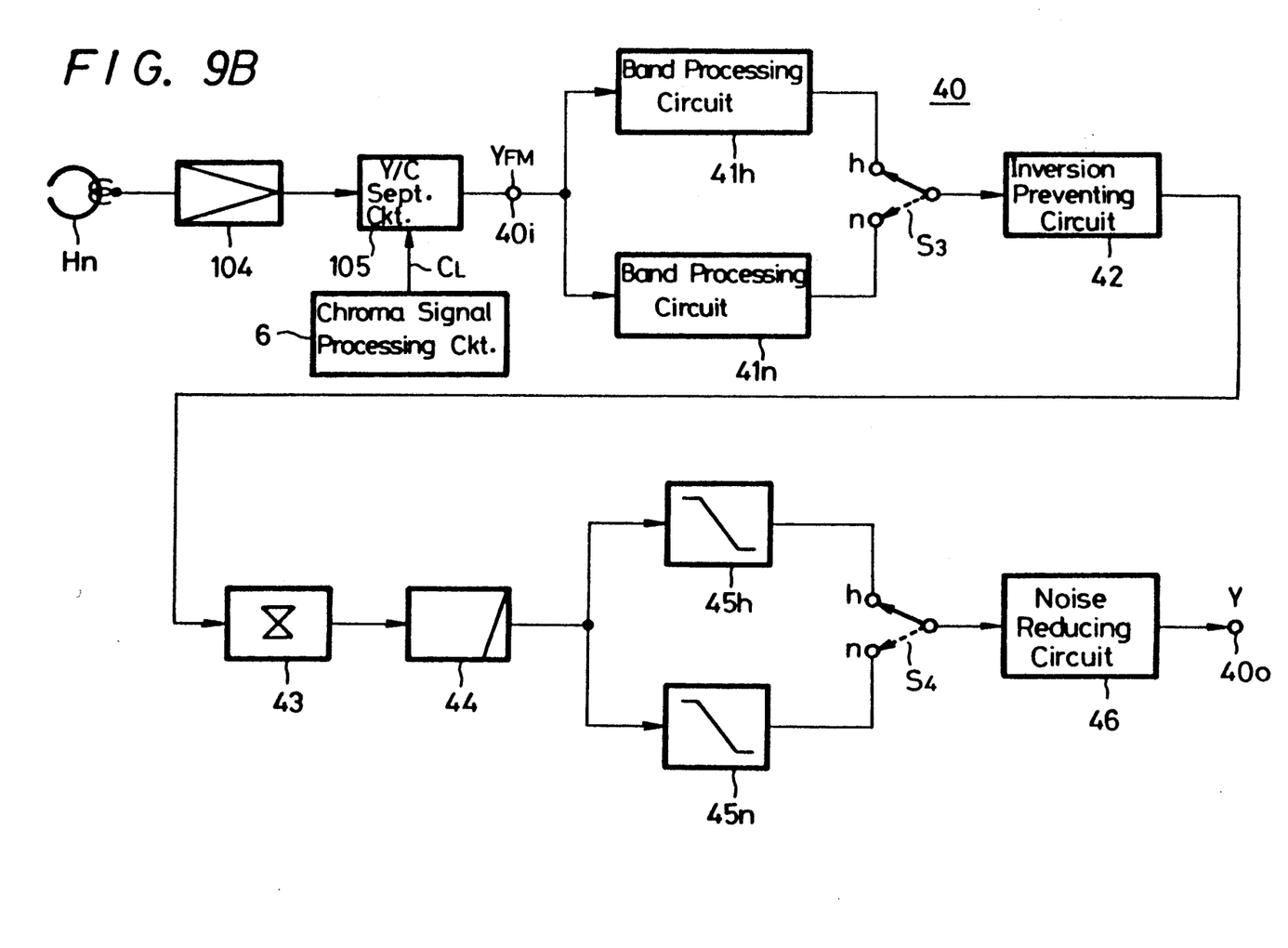

A second embodiment of the present invention will be described hereinafter with reference to FIGS. 9A, 9B and FIGS. 10A, 10B. In FIGS. 9A and 9B, like parts corresponding to those of FIGS. 5A and 5B are marked with the same references and therefore need not be described in detail.

Referring to FIG. 9A, there is provided the luminance signal recording system 30 which is arranged to be capable of coping with the normal mode in this embodiment. The luminance signal Y from the input terminal 30i is supplied to the band limiting circuit 31n corresponding to the normal mode, and an output of the band limiting circuit 31n is supplied through the pre-emphasizing circuit 32n to the modulation setting circuit 33n, in which the DC level and the AC amplitude are set to the predetermined values of the normal mode. An output of the modulation setting circuit 33n is supplied to the FM modulator 34n, and the FM luminance signal YFM shown on the table 1 is output from the FM modulator 34. The output of the FM modulator 34 n is supplied through the equalizing circuit 35n to the output terminal 30o. This output at the output terminal 30o is supplied through the adder 100 and the amplifier 103 to the magnetic head Hn of the normal recording mode.

Refering to FIG. 9B, there is shown the luminance signal reproducing system 40. In the Y/C separating circuit 105, the FM luminance signal YFM is separated from the reproduced RF signal from the magnetic head Hn and is fed to the input terminal 40i. This FM luminance signal YFM is commonly supplied to the RF band processing circuits 41h and 41n of the high image quality mode and the normal mode, and the outputs of the RF band processing circuits 41h and 41n are supplied through the change-over switch S3 and a common inversion preventing circuit 42 to the FM demodulator 43. An output of the FM demodulator 43 is supplied through a common low-pass filter 44 to the de-emphasizing circuits 45h and 45n of the high image quality mode and the normal mode. Reproduced luminance signals Y from the de-emphasizing circuits 45h and 45n are supplied through the changeover switch S4 and a common noise reducing circuit 46 to the output terminal 40o.

Figure 10A:
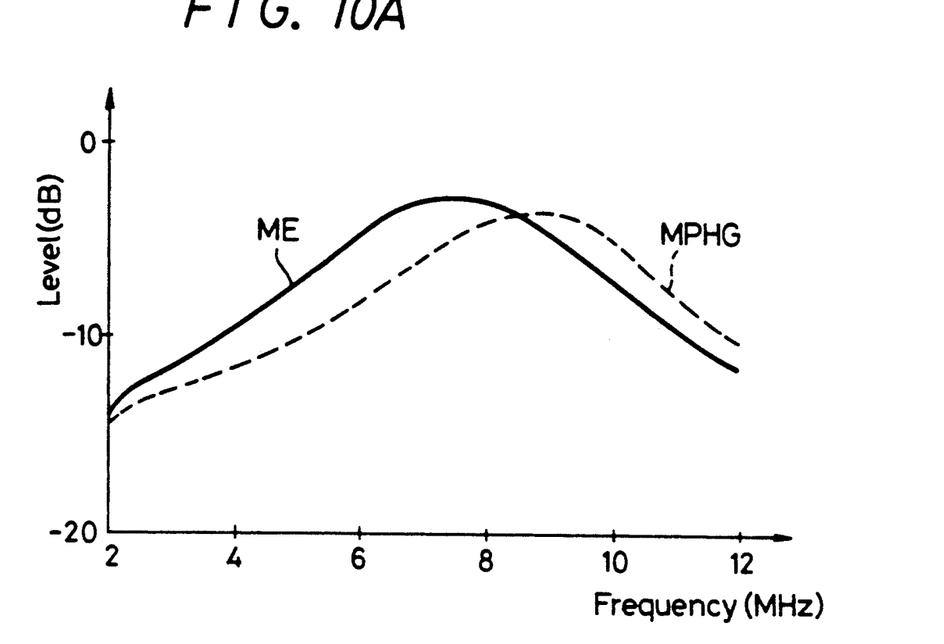
FIGS. 10A and 10B are characteristic graphs, respectively, of frequency versus signal level, and to which references will be made in explaining operation of the magnetic recording and reproducing apparatus shown in FIGS. 9A and 9B.

Operation of the circuit arrangements of FIGS. 9A, 9B will be described hereinafter with reference to FIGS. 10A and 10B.

As is clear from the above-mentioned arrangement, in the recording system 30 of this second embodiment, the signal processing corresponding to the normal mode is performed. Further, in the reproducing system 40, when the change-over switches S3 and S4 are connected to the contacts n, the reproducing processing corresponding to the normal mode is carried out, while when they are connected to the contacts h, the reproducing processing corresponding to the high image quality mode is carried out.

In this embodiment, similar to the example of the prior art, the frequency characteristic of the band processing circuit 41h of the high image quality mode is set so as to be applied to the normal mode magnetic head Hn and the succeeding inversion preventing circuit 42 so that the both side band waves of the FM signal are generally balanced. Thus, as shown by a solid line and a dashed line in FIG. 10A, in any case of the ME tape and the MPHG tape, the frequency characteristic of the band limiting circuit 41h of the normal mode is selected to be sharper than that of the band limiting circuit 41h of the high image quality mode as shown in FIG. 6A.

Figure 10B:
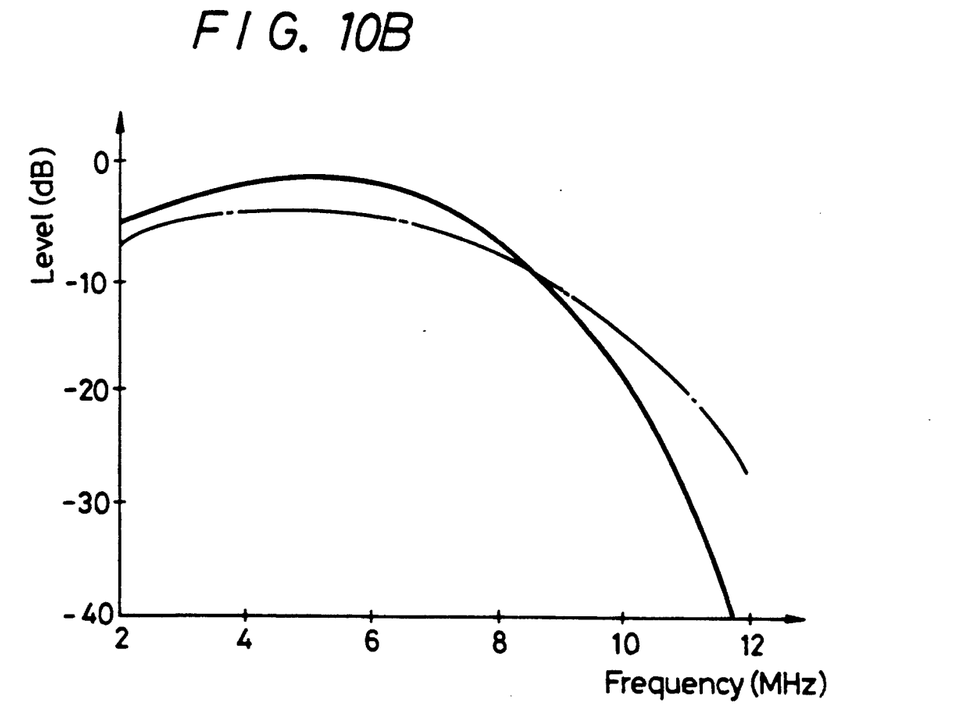

Therefore, the total frequency characteristic of the band limiting circuit 41h and the magnetic head Hn becomes as shown by a solid line in FIG. 10B, wherein a response of the high frequency region and which is lowered due to the magnetic head Hn of the normal mode can be substantially compensated. For comparison, the total frequency characteristics of the conventional magnetic head Hn of the high image quality mode is represented by a one-dot chain line in FIG. 10B.

Further, in this embodiment, the frequency characteristic of the low-pass filter 44 is selected to be a little wider than the frequency characteristic of 3 MHz flat of the low-pass filter 44n of FIG. 5B.

As a consequence, according to this embodiment, in the case of the high image quality reproduction, horizontal resolutions of about 300 to 350 horizontal scanning lines can be obtained, which is not equal to the real high image quality reproduction but which can easily reproduce a video image of remarkably high quality.

Incidentally, when the frequency characteristic of the low-pass filter 44 is set to be wide similar to the low-pass filter 44h of the high image quality of FIG. 5B, if the reproduction of the normal mode is carried out, the S/N ratio is lowered a little and a beam of an aliasing noise is produced. In that case, however, according to the present invention, a stable reproduced picture can be obtained.

While in the above-described second embodiment the recording system 30 is arranged so as to correspond with the normal mode, the recording system 30 is not limited thereto and may be arranged so as to correspond with the high image quality mode.

As set out above, according to the second embodiment of the present invention, since the recording system is arranged so as to correspond with one of a plurality of recording systems in which the frequency deviation of the FM luminance signal is wide or narrow and plurality of band processing circuits for processing signals before being demodulated and a plurality of de-emphasizing circuits corresponding to a plurality of recording systems are provided, the magnetic recording and reproducing apparatus can be reduced in circuit scale, reduced in cost and can perform the reproductions corresponding to the plurality of recording systems.

Having described preferred embodiments of the invention with reference to the accompanying drawings, it is to be understood that the invention is not limited to those precise embodiments of the invention and that various changes and modifications thereof could be effected by one skilled in the art without departing from the spirit or scope of the novel concepts of the invention as defined in the appended claims.

We claim as our invention:

1. A recording mode discriminating circuit for discriminating reproduced signals of first and second recording modes in which a carrier frequency of a frequency-modulated luminance signal is high and low, respectively, comprising:
   a first bandpass filter having a central passband frequency based on an upper side band wave frequency of the reproduced signal of the first recording mode;
   a second bandpass filter having a central passband frequency based on a predetermined carrier frequency of the reproduced signal of the second recording mode;
   discharge control means for passing or interrupting a current therethrough of a first predetermined value in response to the presence or absence, respectively, of a signal through said first bandpass filter when said reproduced signals are supplied to said first and second bandpass filters;
   charge and discharge control means for passing or interrupting a current therethrough of a second predetermined value smaller than said first predetermined value in response to the presence or absence, respectively of an output of said second bandpass filter; and
   a capacitor commonly connected to outputs of said discharge control means and said charge and discharge control means, wherein first and second recording modes of said reproduced signals are discriminated on the basis of a voltage across said capacitor.

2. The recording mode discriminating circuit according to claim 1, further comprising a buffer amplifier having an input connected to said capacitor so that a level of a discriminating signal output therefrom is responsive to the voltage across said capacitor.

3. The recording mode discriminating circuit according to claim 1, wherein the voltage circuit of said capacitor is substantially equal to 0.1 $\mu$F.

4. The recording mode discriminating circuit according to claim 1, wherein said discharge control means comprises a transistor input circuit for connecting an output of said first bandpass filter to a first transistor having a base area substantially larger than a base area of a transistor in said transistor input circuit.

5. The recording mode discriminating circuit according to claim 4, wherein said transistor input circuit comprises a pair of transistors connected in differential fashion.

6. The recording mode discriminating circuit according to claim 5, wherein the base area of said first transistor is four times greater than a base area of one of the transistors of said pair.

7. The recording mode discriminating circuit according to claim 4, wherein said capacitor is connected to the emitter circuit of said first transistor through a series-connected resistor.

8. The recording mode discriminating circuit according to claim 1, further comprising a detector circuit for connecting the output of said second bandpass filter to said charge and discharge control means, said detector circuit including a phase inversion circuit receiving the output from said second bandpass filter and a full-wave rectifier circuit connected to said phase inversion circuit and to an input of said charge and discharge control means.

9. The recording mode discriminating circuit according to claim 8, wherein said phase inversion circuit comprises a first pair of differentially connected transistors and said full-wave rectifier comprises a second pair of transistors having respective base leads connected to outputs of said first pair of differentially connected transistors, said second pair of transistors having respective base areas substantially equal to two times a base area of respective transistors in said first pair.

10. The recording mode discriminating circuit according to claim 9, wherein said charge and discharge control means comprises a third pair of transistors connected as a current mirror and having an input connected to a common collector connection of said second pair of transistors.

11. The recording mode discriminating circuit according to claim 10, wherein a base area of respective transistors in said third pair is substantially equal to four times a base area of respective transistors in said first pair.

12. The recording mode discriminating circuit according to claim 10, wherein an output from a collector of said third pair of transistors connected as a current mirror is connected to said capacitor.

13. The recording mode discriminating circuit according to claim 12, wherein a current source is connected between said third pair of transistors connected as a current mirror and ground potential.

* * * * *

UNITED STATES PATENT AND TRADEMARK OFFICE
CERTIFICATE OF CORRECTION

PATENT NO.  : 5,223,945
DATED       : June 29, 1993
INVENTOR(S) : Takashi Honda; Jun Hirai It is certified that error appears in the above-indentified patent and that said Letters Patent is hereby corrected as shown below:

```
In the Abstract, line 23, after "apparatus" delete ","
Col. 1, line 8, after "and" insert --,--
Col. 4, line 13, delete "reference"
        line 37, after "is" insert --supplied--
        line 43, change "41h, respectively and 41n."
   to --41h and 41n, respectively.--
Col. 8, line 61, change "R5" to --Rt--
Col. 9, line 18, after "transistors" second occurrence,
        delete ","
Col. 11, line 48, change "41h" to --41n--
Col. 12, line 20, after "and" insert --a--

Col. 13, line 7, change "circuit" to --capacity--
```

Signed and Sealed this

Twelfth Day of September, 1995

Attest:

BRUCE LEHMAN

Attesting Officer    Commissioner of Patents and Trademarks